F. W. TOLLEY.
Cultivator.
No. 161,455.  Patented March 30, 1875.
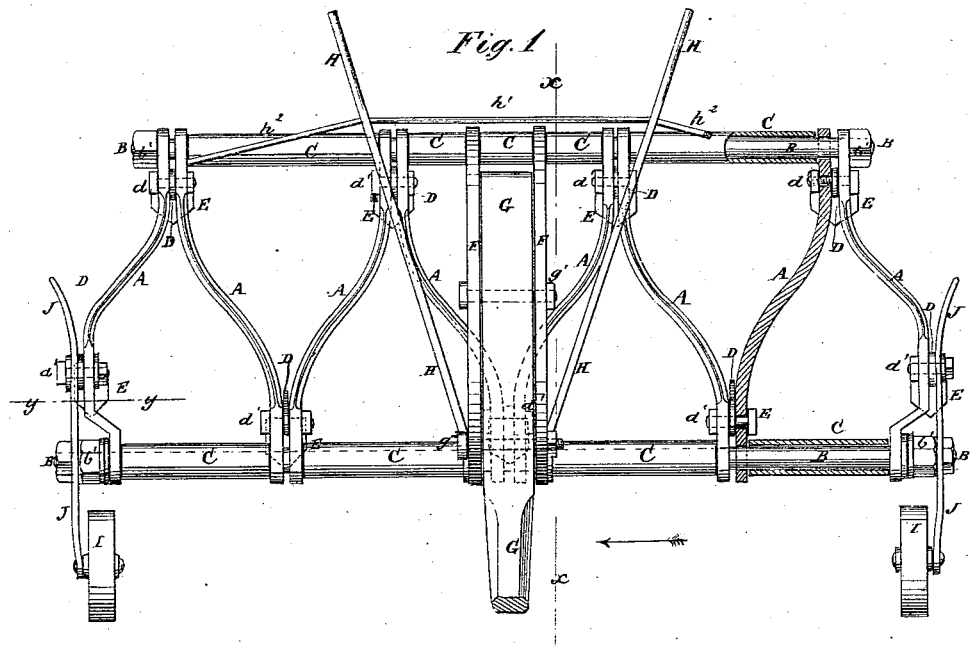
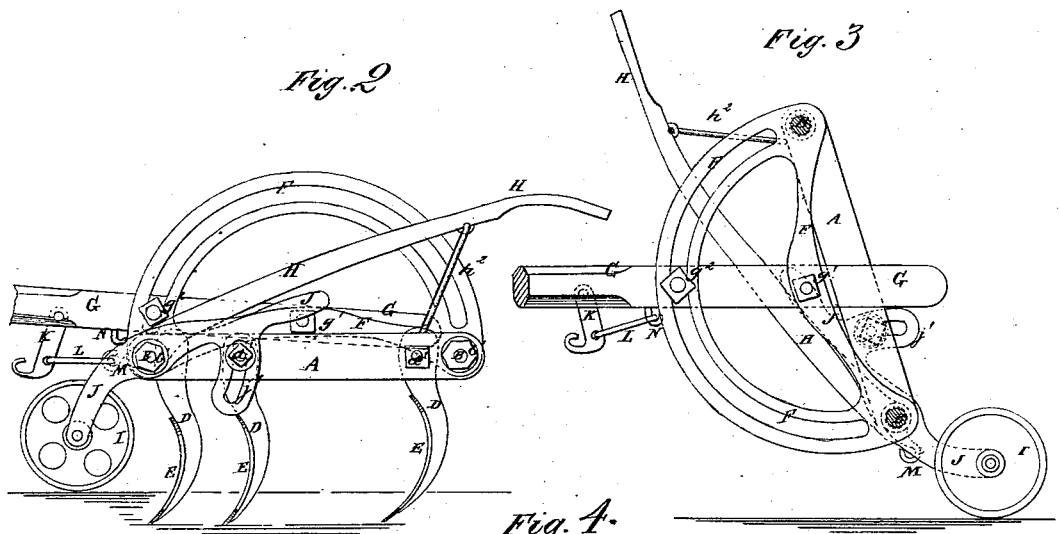
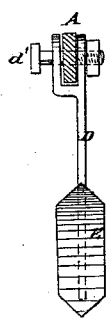
WITNESSES:
A. W. Almqvist
A. F. Terry
INVENTOR:
Frederick W. Tolley
BY ____
ATTORNEYS.

UNITED STATES PATENT OFFICE.

FREDERICK W. TOLLEY, OF COXSACKIE, NEW YORK.

IMPROVEMENT IN CULTIVATORS.

Specification forming part of Letters Patent No. 161,455, dated March 30, 1875; application filed January 4, 1875.

*To all whom it may concern:*

Be it known that I, FREDERICK W. TOLLEY, of Coxsackie, in the county of Greene and State of New York, have invented a new and useful Improvement in Cultivators, of which the following is a specification:

Figure 1 is a top view of my improved cultivator, partly in section, to show the construction. Fig. 2 is a side view of the same, Fig. 3 is a detail vertical section of the same, taken through the line $x\ x$, Fig. 1, and showing the cultivator arranged for transportation. Fig. 4 is a detail section taken through the line $y\ y$, Fig. 1.

Similar letters of reference indicate corresponding parts.

This invention will first be fully described, and then pointed out in the claims.

A are the longitudinal bars of the cultivator-frame, which are curved, as shown in Fig. 1, and are arranged with their opposite ends in contact with the ends of alternate bars. Through the ends of the curved bars A are formed holes, through which are passed rods B, and which are kept at the proper distance apart by tubular washers C, placed upon the said rods B, and interposed between the pairs of ends of the curved bars A. The bars A and washers C are pressed together, making the whole frame firm and strong by nuts $b'$, screwed upon the ends of the said rods B. D are the plow-standards, to the lower ends of which are attached the plows E. The upper ends of the standards D are inserted between the adjacent ends of the bars A, and are secured in place by bolts $d'$, passed through them and through the said bars A. The standards D should have shoulders formed upon them, to rest against the lower edges of the bars A, and prevent the said standards from being forced back by the draft-pressure; or the upper ends of the standards D may have slots formed in them to receive the adjacent ends of the pairs of bars A, as shown in Fig. 4, where they are secured in place by bolts $d'$. In this case the bottom of the slots rests against the lower edges of the bars A, to sustain the draft-pressure. The frame-work is arranged with an odd number of plows in front and an even number in the rear. F are two semicircular plates, through the corners of which are formed holes to receive the rods B. The forward ends of the plates F are placed upon the opposite sides of the ends of the central pair of bars A. The rear ends of the semicircular plates F are kept at the proper distance apart upon the rear rod B by a tubular washer, C, placed upon the said rear rod B. The middle parts of the plates F are cut away, as shown in Figs. 2 and 3, to make them lighter. G is the tongue, the rear part of which is pivoted to and between the centers of the base-bars of the plates F by a bolt, $g^1$. The tongue G is also connected with the plates F by a second bolt, $g^2$, which passes through the said tongue, and through the curved slots in the plates F near their curved edges. The slots of the plates F are curved upon the arc of a circle having its center at the bolt $g^1$, so that the tongue G can turn upon the said bolt $g^1$ as a center. H are the handles, the forward ends of which are bolted upon the outer sides of the plates F. The handles H are connected by a round, $h^1$, and are supported at the proper height by the braces $h^2$, the inner ends of which are attached to the said handles, and their outer ends have eyes formed in them to receive the bolts $d'$, that secure the outer rear standards D. I are small wheels, that are pivoted to the inner sides of the lower ends of the levers J, which are pivoted upon the outer ends of the forward rod B. Upon the levers J are formed downwardly-projecting curved arms $j'$, in which are formed slots curved upon the arc of a circle, having its center in the axis of the forward bar B, and which are designed to receive the bolts $d'$, that secure the outer forward plow-standards D. The forward ends of the outer bars A are made with an offset, as shown in Fig. 1, of about the thickness of the nuts $b'$, so that the levers J, which are placed upon the bar B at the outer side of the said nuts $b'$, may pass back along the said bars A to receive the bolts $d'$. The rear ends of the levers J project, so that they may serve as handles for adjusting the levers J when the nuts of the bolts $d'$ and bar B have been loosened. The wheels I serve as gage-wheels to regulate the depth to which the plows E enter the ground, and also as transporting-wheels when passing to and from the field and from place to place. In the last case the machine is turned up into the position shown in Fig. 3, where it is held steadily in position by the rear end of the tongue G, resting in the angle between the forward ends of the middle bars A. K is the draft-hook, the upper end of which is pivoted to the tongue G a little in front of the forward rod B. To the lower part of the draft-hook K is pivoted a link, L, which, when the cultivator is in working position, is hooked upon a hook, M, placed upon the forward rod B, as shown in Fig. 2, and which, when the cultivator is in position for transportation, is hooked upon a hook, N, attached to the tongue G, as shown in Fig. 3. By detaching the middle forward plow-standard D, the machine is adjusted for cultivating rows of plants.

Having thus described my invention, what I claim as new, and desire to secure by Letters Patent, is—

1. A cultivator-frame consisting of curved bars A, long rods B, with end screws receiving nuts, and tubular washers C, all substantially as shown and described.

2. The combination, with frame and pivoted tongue, adjustable in slotted guides F, of the pivoted draft-hook K, having link L, adapted to couple with the hook M or N, in the manner and for the purpose specified.

FREDERICK W. TOLLEY.

Witnesses:
JAMES T. GRAHAM,
T. B. MOSHER.